3,360,548
PRODUCTION OF SATURATED ESTERS BY OXI-
DATION OF ALKENYL HALIDES OR ALKENYL
ESTERS OF CARBOXYLIC ACIDS
Duncan Clark and Percy Hayden, Norton-on-Tees, England, assignors to Imperial Chemical Industries Limited, London, England, a corporation of Great Britain
No Drawing. Filed July 25, 1966, Ser. No. 567,364
Claims priority, application Great Britain, Nov. 12, 1962, 46,621/62
15 Claims. (Cl. 260—491)

ABSTRACT OF THE DISCLOSURE

An olefinically unsaturated compound of formula $$R.CH=CH.CH(R^1)X$$

such as allyl acetate or allyl chloride is reacted with a carboxylic acid in the presence of a palladous salt catalyst, a copper redox system and a specified halide ion concentration whereby ester groups are introduced on each of the carbon atoms linked to the double bond of the olefinically unsaturated starting compound. The carboxylate moiety of the ester may be hydrolyzed off to leave, for example, glycerol. The halide ion concentration is at least 0.05 molar, a concentration in the range 0.1 to 3 molar being preferred.

---

This application is a continuation-in-part of copending U.S. application Ser. No. 319,536, filed Oct. 28, 1963, now abandoned.

This invention relates to the production of esters, particularly esters of glycerol and substituted glycerols.

According to one form of the present invention, there is provided a process for the production of saturated esters of compounds having the formula $$R—CH=CH—CH(R^1)X$$

which comprises the step of reacting a compound having the structure $R.CH=CH.CH(R^1)X$, in which R is a monovalent radical selected from the group consisting of hydrogen, alkyl, aryl, alkaryl and aralkyl, $R^1$ is a monovalent radical selected from the group consisting of hydrogen and alkyl, and X is a monovalent radical selected from the group consisting of halogen and acyloxy, at a temperature not exceeding 200° C. with a solution containing as the only reactive components a carboxylic acid, a palladous salt, a cupric salt, a metal halide selected from the group consisting of chlorides, bromides and iodides, and less than 25% by weight of water, the halide ion concentration being in the range 0.05 to 1.0 molar so as to produce said saturated esters.

It is desirable to carry out the process in the presence of molecular oxygen. For instance, air or oxygen may be passed continuously through the reaction zone. In this way, the catalyst system is continuously regenerated.

The most important starting materials for use in the present process are allyl compounds, notably allyl acetate and other allyl esters, and halides, notably allyl chloride. Under the preferred operating conditions allyl acetate gives glyceryl esters. Thus, when acetic acid is used as the carboxylic acid, allyl acetate gives glyceryl acetates, notably glyceryl diacetate and glyceryl triacetate. When allyl choride is used as the starting material the product obtained contains also a substantial proportion of the mono and diacetates of 1:2-dihydroxy-3-chloropropane. Other starting materials which may be used in the present process include crotyl compounds, such as crotyl acetate or crotyl chloride, and compounds containing an alkyl group on the carbon atom adjacent to the halogen or acyloxy group. Thus, it is possible to use 3-acyloxy-butene-1. When this compound or crotyl acetate is used as the starting material in conjunction with the reaction mixture containing acetic acid, the product comprises di and triacetates of n-butane-1:2:3-triol. Similarly, when using crotyl chloride as the starting material, the product comprises mono and diacetates of 2:3-dihydroxy-1-chlorobutane.

The further discussion of this invention insofar as products obtained are concerned is in terms of the use of allyl acetate as the starting material, but it will be understood that when other starting materials are used corresponding products are obtained.

In the present process, the cupric salt is preferably continuously regenerated in situ by molecular oxygen as the reaction proceeds and this results in the continuous production of water. Furthermore, if desired, water may be added deliberately to the reaction system, although as already stated, the water content of the reaction mixture should be less than 25% by weight and is preferably less than 10% by weight. When using allyl acetate as the starting material, the ratio of diacetate to triacetate obtained increases and indeed some glyceryl mono-acetate and even small amounts of free glycerol may be produced at relatively high water contents, especially after long reaction periods. Thus, to obtain a desired distribution of esters in the final product, it may be desirable to adjust the water concentration of the reaction system to a specific value, although in general this adjustment is automatically effected by the choice of, for instance, gas space velocity and temperature.

The preferred palladous salt for use in the present process is a palladous halide other than palladous fluoride, notably palladous chloride or bromide. The metal halide employed in conjunction with this is preferably a chloride or bromide. An alkali metal chloride, notably lithium chloride, is most suitable. During the reaction there is a tendency for chloride to be lost from the reaction system and this can be replaced by the continuous or intermittent addition of lithium chloride or, preferably, hydrogen chloride. Other suitable chlorides which may be used are cupric chloride and ferric chloride. Although as described above the chloride ion molar concentration in the one form of the invention is in the range 0.05 to 1.0 molar, in other forms different ranges of chloride in concentration may be used; for example, starting with allyl or crotyl chloride or acetate, the chloride ion concentration may be 0.37 to 1.32 molar. In a preferred form of the invention the chloride ion concentration is at least 0.1 molar and is in excess of that required to maintain the copper in solution. In this case the molar concentration of the chloride ions is preferably greater than the molar concentration of copper in the solution and more preferably greater than 1.5 times the molar concentration of copper in solution. In general chloride ion concentrations in the range 0.1 to 3 molar are preferred, especially 0.15 to 1.5 molar. High chloride concentrations are to be avoided because they encourage the formation of chlorinated byproducts. The concentration of chloride ion is calculated by assuming that all inorganic chlorides such as palladous chloride, cupric chloride and lithium chloride are completely ionised, but that organic chlorides, such as allyl chloride, do not make a contribution to the chloride ion concentration. However, if an organic chloride is present, this will undergo solvolysis to some extent, and, of course, the chloride ions formed in this way are included in the calculation of chloride ion concentration.

The cupric salt employed in the present process behaves as a redox system, that is, it re-oxidises palladium which would otherwise be precipitated, itself undergoing reduction in doing this. The reduced form of the redox system is then re-oxidised by molecular oxygen. As already stated, this re-oxidation is preferably carried out in situ by introducing molecular oxygen into the ester-synthesis zone. However, if desired, some at least of the catalyst system may be withdrawn with at least part of the copper present as a cuprous compound, and this may be oxidised with molecular oxygen in a zone other than the ester-synthesis zone, the re-oxidised mixture then being recycled to the ester-synthesis zone. The most suitable cupric salts are cupric acetate, cupric chloride and cupric bromide.

If it is desired to operate the process at low halide ion concentrations, e.g., 0.1 molar, a low copper salt concentration may be used. The reduction in overall copper concentration reduces the rate of reaction however and may require an increased oxygen partial pressure for example, to obtain an effective rate and yield of the desired products. The concentration of the copper salt may be 0.02 to 1 mole per litre, preferably 0.15 to 0.75 mole per litre. If desired the copper salt may be used in conjunction with other redox systems, for example ferric salts or organic redox systems such as para-benzoquinone, duroquinone or 2-ethylanthroquinone.

From the above discussion it will be noted that an inter-relationship exists in the process between the halide ion concentration and copper salt concentration. This arises because two most important factors for effective operation of the process are the prevention of the precipitation from solution of copper as a cuprous salt, especially cuprous chloride, and the maintenance of palladium substantially in the form of a halo-complex. Both of these aims may be achieved by keeping an adequate concentration of halide ions in solution.

Although the choice of concentration of halide ions is dictated by the concentration of copper in the solution the solubility of the copper is itself dependent on the relative proportions of cupric and cuprous states present, the cuprous state being less soluble. These relative proportions are dependent on the other significant features of palladous salt concentration, concentration of

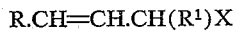

the concentration of acetic acid, the temperature, and oxygen partial pressure. The lower the concentration of one or more of palladous salt, acetic acid and

the slower the rate of the oxidation reaction and the slower the rate of formation of the cuprous state. Suitably the concentration of the palladous salt is 0.0005 to 0.1 mole per litre of solution and the concentration of

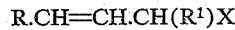

is 0.05 to 8 moles per litre of solution. To maintain an effective rate of reaction however the palladous salt concentration is preferably at least 0.005 mole per litre of solution and the concentration of $R.CH=CH.CH(R^1)X$ at least 0.1 mole per litre of solution. The effect of a high oxygen partial pressure is to maintain a low concentration of the cuprous state in solution and at low halide concentrations to give an increased rate of reaction. Elevated oxygen partial pressures are therefore advantageous although introducing certain attendant difficulties such as an explosion hazard. Suitable oxygen partial pressures lie in the range 0.1 to 20 atmospheres and higher e.g. up to 50 atmospheres, preferably up to 10 atmospheres e.g. in the range of 0.2 to 10 atmospheres. The oxygen may be used admixed with an inert gas, for example as air.

Although as described above the process may be operated effectively at low halide ion concentrations by choice of suitable concentrations of palladous salt, copper salt, $R.CH=CH.CH(R^1)X$ and oxygen partial pressure, it is usually preferred to maintain a halide ion concentration of 0.3 to 1.5 moles per litre. At these concentrations the concentration of the copper salt is preferably 0.05 to 1.0 mole per litre, the palladous salt 0.005 to 0.05 mole per litre, $R.CH=CH.CH(R^1)X$ 0.1 to 2.0 moles per litre and the oxygen partial pressure 0.1 to 5 atmospheres.

When palladous chloride and cupric chloride and possibly lithium chloride are present as the only inorganic starting materials, there is, in general, an induction period. This can be decreased or entirely avoided by incorporating into the reaction mixture a carboxylate which is ionised under the reaction conditions. This is preferably a salt of one or more of the metals lithium, sodium, potassium, magnesium, calcium, barium or strontium. In particular, lithium carboxylates are preferable. It is also possible to use a carboxylate of copper. The carboxylate is preferably selected to correspond to the free carboxylic acid employed. Thus, in the production of acetates using acetic acid, the carboxylate is preferably lithium acetate or cupric acetate. While it is essential to have acetate ions present for the reaction to proceed, the yield of desired products decreases with increasing acetate ion concentration, and thus it is preferable to limit the acetate ion concentration to 1.0 molar.

A wide range of carboxylic acids and carboxylates may be used. For example, it is possible to use aliphatic monocarboxylic acids, such as acetic acid and propionic acid, aliphatic dicarboxylic acids, such as adipic acid, aromatic monocarboxylic acids, such as benzoic acid, and aromatic dicarboxylic acids, such as the phthalic acids. A carboxylate derived from any of these acids may be used as the carboxylate ionised under the reaction conditions.

The present process may be carried out at room temperature or at an elevated temperature of up to 200° C., temperatures in the range of 50° to 150° C. being particularly suitable.

In carrying out the present process, it is advantageous to maintain a high stationary concentration of the ester product, for example 20% to 80% by volume of the reaction mixture, preferably 50% to 80% by volume of the reaction mixture. The use of this stationary concentration makes it easier to dissolve the starting materials and also facilitates the separation of products. Thus when allyl acetate and acetic acid are reactants it is advantageous to maintain a high stationary concentration of glyceryl diacetate, for example 20% to 60% by volume of the reaction mixture.

Glyceryl esters may be separated from the reaction product by solvent extraction, using as solvent for example the following compounds alone or in admixture: high-boiling saturated hydrocarbons; aromatic hydrocarbons such as benzene; higher ketones such as octanone-2; or halogenated hydrocarbons such as carbon tetrachloride and ethylene dichloride. Alternatively the glyceryl esters may be removed from the reaction product by fractional distillation.

The glyceryl esters produced by the present process may be hydrolysed to glycerol by steam or by heating them in the presence of an aqueous mineral acid or alkali. Free glycerol may also be obtained by treating the esters with a lower alcohol such as methanol. The free carboxylic acid or alkali metal carboxylate formed in this way may be recycled for use in the ester-synthesis zone.

When allyl acetate is reacted with a solution containing acetic acid, lithium chloride, palladous chloride, and cupric acetate or cupric chloride, the products include in general, in addition to glyceryl acetate, mixed chloroacetate esters of glycerol, for example diacetates of 1:2-dihydroxy - 3 - chloropropane and of 1:3-dihydroxy-2-chloropropane. These chloro compounds, like glyceryl acetates, may be hydrolysed to glycerol itself and, if the product of the present invention is to be used for the production of glycerol by hydrolysis, they may be hydrolysed in admixture with the glyceryl acetates. Other by-products which may be formed include the acetate of hydroxy-acetone, acrolein and unsaturated dicarboxylic esters, notably alpha- and beta-acetoxy allyl acetates and gamma-acetoxy allyl acetate (allylidene diacetate).

Glyceryl esters produced by the present invention may be employed as such. For example, glyceryl triacetate may be used as a plasticiser or in cosmetics. Otherwise, the esters may be hydrolysed to glycerol which may be used, for example, in anti-freeze compositions and in the manufacture of resins.

The invention will now be further described with reference to the following examples, in which, unless the contrary is specified, diacetate means glyceryl diacetate and triacetate means glyceryl triacetate.

Example 1

A series of solutions was made up in acetic acid as follows, the quantities in all cases being molar, and the total volume being 200 ml.

|  | Run 1 | Run 2 | Run 3 |
|---|---|---|---|
| Palladous chloride | 0.01 | 0.01 | 0.01 |
| Lithium chloride | 0.35 | 0.5 | 0.75 |
| Cupric acetate | 0.15 | 0.15 | 0.15 |
| Allyl acetate | 2.0 | 2.0 | 2.0 |

These solutions were raised to a temperature of 90° C. and oxygen was passed through at a rate of 30 litres per hour. In the three runs, the duration of reaction was 120, 80 and 130 minutes respectively. At the end of the times stated, the reaction liquids were analysed. The results are set out in the table below.

|  | Run 1 | Run 2 | Run 3 |
|---|---|---|---|
| Diacetate in reaction liquid (percent by weight) | 4.76 | 4.85 | 7.62 |
| Triacetate in reaction liquid (percent by weight) | 1.82 | 2.12 | 1.02 |
| Water in reaction liquid (percent by weight) | 0.3 | 0.5 | 0.4 |
| Diacetate+triacetate produced (mole) | 0.0754 | 0.0799 | 0.1037 |
| Total rate of diacetate+triacetate production (mole/litre/hour) | 0.189 | 0.299 | 0.239 |
| Total yield of diacetate+triacetate on oxygen consumed (percent) | 69.6 | 72.5 | 95.0 |

Example 2

Two solutions were made up in acetic acid as follows, the total volume being 200 ml.

| | Molar |
|---|---|
| Palladous chloride | 0.01 |
| Lithium chloride | 1.0 |
| Cupric acetate | 0.15 |
| Allyl acetate | 2.0 |

The first run was carried out exactly as described in Example 1. The second run was carried out in a similar manner except that 5% by weight of water was added. The durations of the two runs were 170 and 120 minutes respectively. At the end of these times the reaction liquids were analysed. The results are set out in the table below.

|  | Run 1 | Run 2 |
|---|---|---|
| Diacetate in reaction liquid (percent by weight) | 4.95 | 4.4 |
| Triacetate in reaction liquid (percent by weight) | 1.41 | 0.31 |
| Water in reaction liquid (percent by weight) | 0.3 | 5.3 |
| Weight ratio diacetate:triacetate | 3.5:1 | 14.3:1 |
| Diacetate+triacetate produced (mole) | 0.0756 | 0.0575 |
| Total rate of diacetate+triacetate produced (mole/litre/hour) | 0.134 | 0.144 |
| Allyl acetate consumed (mole) | 0.146 | 0.105 |
| Yield of diacetate+triacetate on allyl acetate consumed (percent) | 51.8 | 54.8 |

Thus, under closely comparable conditions, it is evident that the presence of a greater quantity of water leads to a greater diacetate:triacetate weight ratio in the reaction mixture.

Example 3

A solution was made up in acetic acid as follows, the total volume being 200 ml.

| | Molar |
|---|---|
| Palladous chloride | 0.01 |
| Lithium chloride | 1.0 |
| Cupric chloride | 0.15 |
| Allyl acetate | 2.0 |

The difference between this solution and those employed in previous examples is that, initially, it did not contain any metal acetate. The solution was reacted in the presence of oxygen as described in Example 1. There was an induction period of 40–60 minutes during which no appreciable reaction occurred. The total duration of reaction was 257 minutes and at the end of this time the reaction liquid was analysed. It contained by weight, 6.32% diacetate and 0.64% triacetate. The total amount of diacetate+triacetate produced was 0.0841 mole, the rate of production being 0.098 mole per litre per hour (the reaction time, for purposes of calculation, including the induction period). The amount of allyl acetate consumed was 0.0985 mole, so that the yield of diacetate+triacetate was 85.4%.

Example 4

Two solutions were made up in acetic acid as follows, the total volume being 200 ml., and the concentrations in all cases being molar:

|  | Run 1 | Run 2 |
|---|---|---|
| Palladous chloride | 0.01 | 0.01 |
| Lithium chloride | 1.0 | 1.0 |
| Cupric acetate | 0.3 | 0.05 |
| Allyl acetate | 2.0 | 2.0 |

Reaction was carried out as described in Example 1, the duration of the two runs being 50 and 330 minutes respectively. At the end of these times, the reaction liquids were analysed and the results are given in the table below.

|  | Run 1 | Run 2 |
|---|---|---|
| Diacetate in reaction liquid (percent by weight) | 7.1 | 2.51 |
| Triacetate in reaction liquid (percent by weight) | 0.88 | 0.3 |
| Diacetate+triacetate produced (mole) | 0.1014 | 0.0335 |
| Total rate of diacetate+triacetate produced (mole/litre/hour) | 0.608 | 0.031 |

In Run 1, 0.140 mole of allyl acetate was consumed so that the total yield of diacetate+triacetate was 72.5%. In Run 2, 0.0345 mole of allyl acetate was consumed so that the total yield of diacetate+triacetate was 97%. This example shows that an increase in copper concentration increases the rate of diacetate+triacetate produced, but that an increase in acetate concentration decreases the total yield of diacetate+triacetate, based on allyl acetate consumed.

Example 5

A solution was made up in acetic acid of palladous chloride (0.01 molar), lithium chloride (1.0 molar), lithium acetate (0.5 molar), cupric acetate (0.3 molar) and allyl acetate (2.0 molar), the total volume being 200 ml. Oxygen was passed through this solution maintained at room temperature at a rate of 30 litres per hour. Reaction was carried out for 71 hours. At the end of this time the reaction liquid was analysed. It contained, by weight, 4.62% diacetate and 0.31% triacetate. The total quantity of diacetate and triacetate produced was 0.0633 mole, this corresponding to a total rate of diacetate+triacetate production of 0.004 mole per litre per hour. In this reaction, 0.105 mole of allyl acetate was consumed, the total yield of diacetate and triacetate on this being 60.2%.

Example 6

A solution was made up in acetic acid of palladous chloride (0.01 molar) lithium chloride (0.55 molar), cupric acetate (0.15 molar), ferric chloride (0.15 molar) and allyl acetate (2.0 molar), the total volume being 200 ml. This solution was reacted with oxygen as described in Example 1. After 60 minutes the reaction liquid was analysed and was shown to contain by weight 4.79% of diacetate and 1.19% of triacetate. The total quantity of diacetate and triacetate produced was 0.0733 mole and the total rate of diacetate+triacetate production was 0.366 mole per litre per hour. The yield of these esters was 91.9% based on the quantity of oxygen consumed, and 85% based on the quantity of allyl acetate consumed.

Example 7

A solution was made up in acetic acid of palladous chloride (0.01 molar), lithium chloride (0.5 molar), cupric acetate (0.3 molar) and allyl acetate (0.4 molar), the total volume being 200 ml. The solution was reacted with oxygen as described in Example 1. At the end of the reaction, when all the allyl acetate had undergone conversion, it was found that 0.0665 mole of diacetate and 0.0127 mole of triacetate had been formed. The total yield of diacetate and triacetate based on allyl acetate converted was 99%.

Example 8

A solution was made up in acetic acid of palladous chloride (0.01 molar), lithium chloride (1.0 molar), cupric acetate (0.3 molar) and allyl acetate (2.0 molar), the total volume being 200 ml. The solution was raised to a temperature of 90° C. under a nitrogen atmosphere and was maintained at this temperature for 2 hours. At the end of this time, the reaction liquid contained, by weight, 2.57% of diacetate and 0.22% of triacetate. The total amount of diacetate and triacetate formed was 0.0338 mole. The quantity of allyl acetate consumed was 0.0374 mole so that the total yield of diacetate and triacetate produced based on the quantity of allyl acetate consumed was 90.5%.

The partially reduced catalyst-containing solution employed in this example was withdrawn from the reactor. It was found that it was readily re-oxidised by means of air.

Example 9

A solution was made up in acetic acid containing palladous chloride (0.03 molar), lithium chloride (0.5 molar), lithium acetate (0.5 molar), cupric chloride (0.3 molar), cupric acetate (0.15 molar) and allyl chloride (2.45 molar), the total volume being 200 ml. This solution was reacted with oxygen as described in Example 1, the duration of reaction being 290 minutes. At the end of this time, the reaction liquid was analysed. It was shown to contain one or more acetates of 1:2-dihydroxy-3-chloropropane and, by weight, 12.3% diacetate and 3.7% triacetate of glycerol. The total amount of these acetates was 0.207 mole, this corresponding to a total rate of production of 0.214 mole per litre per hour. The whole of the allyl chloride was consumed; the total yield of monoacetate and diacetate of glycerol based on this was 42.2%.

Example 10

A solution was made up in acetic acid containing palladous chloride (0.01 molar), lithium chloride (0.5 molar), cupric acetate (0.15 molar) and crotyl acetate (0.5 molar), the total volume being 200 ml. This solution was reacted with oxygen as described in Example 1, the duration of reaction being 192 minutes. The reaction liquid was found to contain 0.039 mole of acetates of n-butane-1:2:3-triol. Of the crotyl acetate employed, 0.08 mole had undergone conversion, the yield of acetates on this being 49%.

Examples 11–23

The following examples were carried out all using the same method.

The solution of acetic acid with or without diacetin, allyl acetate and metal salts was placed in a stirred flask and heated to 90° C. Oxygen was passed through the solution at a rate of 30 litres per hour, the pressure being maintained at about 1 atmosphere. In none of the experiments was water added although no precautions were taken to remove water formed. The products were analysed chromatographically using triacetin as standard (the product was acetylated to convert all the esters formed to triacetin).

The results of the examples are given in the following table.

| | Example | | | | | | | | | | | | |
|---|---|---|---|---|---|---|---|---|---|---|---|---|---|
| | 11 | 12 | 13 | 14 | 15 | 16 | 17 | 18 | 19 | 20 | 21 | 22 | 23 |
| Lithium chloropalladite, moles/litre | | 0.01 | 0.01 | 0.01 | 0.01 | 0.035 | 0.035 | 0.02 | | | | | |
| Palladous chloride, moles/litre | 0.05 | | | | | | | | 0.01 | 0.01 | 0.01 | 0.25 | 0.01 |
| Lithium chloride, moles/litre | 0.75 | 0.5 | 0.75 | 1.0 | 1.25 | 2.0 | 1.5 | 1.25 | 0.25 | 0.5 | 1.0 | 1.0 | 0.2 |
| Copper acetate, moles/litre | 0.15 | 0.15 | 0.3 | 0.3 | 0.3 | 0.45 | 0.45 | 0.45 | 0.15 | 0.15 | 0.15 | 0.15 | 0.05 |
| Copper chloride, moles/litre | 1.0 | | | | | | | | | | | | |
| Lithium acetate, moles/litre | | | | | | | | | | | 0.5 | 0.5 | |
| Acetic acid, mls | 20 | 117 | 117 | 117 | 117 | 45 | 45 | 85.5 | 80 | 80 | 80 | 80 | 125 |
| Diacetin, mls | 80 | | | | | 78 | 78 | 40 | | | | | |
| Allyl acetate, mls | 20 | 33 | 33 | 33 | 33 | *33 | *33 | *22 | 20 | 20 | 20 | 20 | 34 |
| Molar ratio of halide ions to copper | 2.48 | 3.53 | 2.6 | 3.43 | 4.27 | 4.78 | 3.57 | 2.91 | 1.80 | 3.47 | 6.8 | 10.0 | 4.4 |
| Yield percent on allylacetate converted | 31 | 550 | 75 | 85 | 82 | 70 | 43 | 90 | 20 | 84 | 54 | 60 | 30 |

*The allyl acetate was added in batches of 11 mls. spaced over the reaction period.

From the results given in the table it will be noted that the highest yields are generally obtained at halide ion concentration in the range 0.3 to 1.5 moles per litre of solution.

We claim:

1. A process for preparing a product consisting essentially of saturated esters of compounds having the formula

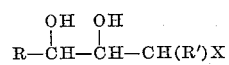

R—CH(OH)—CH(OH)—CH(R')X which comprises the step of reacting a compound having the structure R.CH=CH.CH(R')X in which R is a monovalent radical selected from the group consisting of hydrogen, alkyl, aryl, alkaryl and aralkyl, R' is a monovalent radical selected from the group consisting of hydrogen and alkyl, and X is a monovalent radical selected from the group consisting of halogen and acyloxy, at a temperature of at most 200° C. with a solution containing as the only reactive components a carboxylic acid, a palladous salt, a cupric salt, a metal halide selected from the group consisting of chlorides, bromides and iodides and less than 25% by weight of water, the halide ion concentration being in the range 0.05 to 1.0 molar so as to produce said saturated esters.

2. The process as claimed in claim 1 in which the cupric salt is regenerated in situ by molecular oxygen as the reaction proceeds.

3. The process as claimed in claim 1 in which at least part of the solution is withdrawn as the reaction proceeds, at least part of the copper being present in the cuprous state, this being oxidised by molecular oxygen in a zone other than the ester-synthesis zone, the re-oxidised mixture then being recycled to the ester-synthesis zone.

4. The process as claimed in claim 1 in which the compound of structure R.CH=CH.CH(R')X is selected from the group consisting of allyl acetate, allyl chloride, crotyl acetate and crotyl chloride the temperature is 50° to 150° C. and the solution contains acetic acid, palladous chloride, a cupric salt, lithium chloride and less than 10% by weight of water the chloride ion concentration being at least 0.37 molar.

5. The process as claimed in claim 4 in which an acetate ionised under the reaction conditions is incorporated in the reaction mixture.

6. The process as claimed in claim 5 in which the acetate is lithium acetate.

7. The process as claimed in claim 1 in which the product comprises a mixture of diacetate and triacetate of a compound having the formula

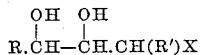

a stationary concentration of said diacetate of 20 to 60% by volume of the reaction mixture being maintained.

8. A process for preparing a product consisting essentially of acetates of compounds having the formula

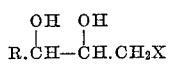

which comprises the step of reacting a compound having the structure R.CH=CH.CH$_2$X in which R is hydrogen or a methyl group and X is chloride or acetate, at a temperature of at most 200° C. with molecular oxygen in a solution containing as the only reactive components acetic acid, a palladous salt, a cupric salt, a metal chloride and less than 25% by weight of water, the chloride ion concentration being in the range 0.37 to 1.32 molar so as to produce said acetates of compounds having the formula

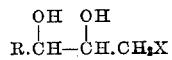

9. A process for preparing a product consisting essentially of saturated esters of compounds having the formula

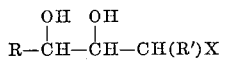

which comprises the step of reacting a compound having the structure R.CH=CH.CH(R')X in which R is a monovalent radical selected from the group consisting of hydrogen, alkyl, aryl, alkaryl and aralkyl, R' is a monovalent radical selected from the group consisting of hydrogen and alkyl, and X is a monovalent radical selected from the group consisting of halogen and acyloxy, at a temperature of at most 200° C. with molecular oxygen in a solution containing as the only reactive components a carboxylic acid, a palladous salt, a copper salt, less than 25% by weight of water and at least 0.1 molar halide ions, the molar concentration of halide ions being greater than 1.5 times the molar concentration of copper in solution.

10. The process as claimed in claim 9 in which the concentration of halide ions is in the range 0.1 to 3 molar.

11. The process as claimed in claim 10 in which the concentration of the copper salt is 0.02 to 1 molar.

12. The process as claimed in claim 10 in which the concentration of the palladous salt is in the range 0.0005 to 0.1 molar.

13. The process as claimed in claim 10 in which the oxygen partial pressure is in the range 0.1 to 20 atmospheres.

14. The process as claimed in claim 9 in which a stationary concentration of reaction product amounting to 50% to 80% by volume of the reaction mixture is maintained.

15. The process of claim 9 in which allyl acetate is reacted at a temperature of at most 200° C. with molecular oxygen at a partial pressure of 0.1 to 5 atmospheres in a solution containing as the only reactive components: acetic acid;
0.05 to 1.0 mole per litre of a copper salt;
0.005 to 0.05 mole per litre of a palladous salt;
less than 10% by weight of water; and
0.3 to 1.5 mole per litre of chloride ions,
the allyl acetate concentration being 0.1 to 2.0 moles per litre and the concentration of chloride ions being in excess of that required to maintain the copper in solution.

References Cited
FOREIGN PATENTS
608,610 3/1962 Belgium.
614,970 9/1962 Belgium.

LORRAINE A. WEINBERGER, *Primary Examiner.*

V. GARNER, *Assistant Examiner.*